Sept. 11, 1934.                    S. L. GOLDSBOROUGH                    1,973,060
                              VARIABLE CHARACTERISTIC RELAY
                               Filed July 7, 1932        2 Sheets-Sheet 1
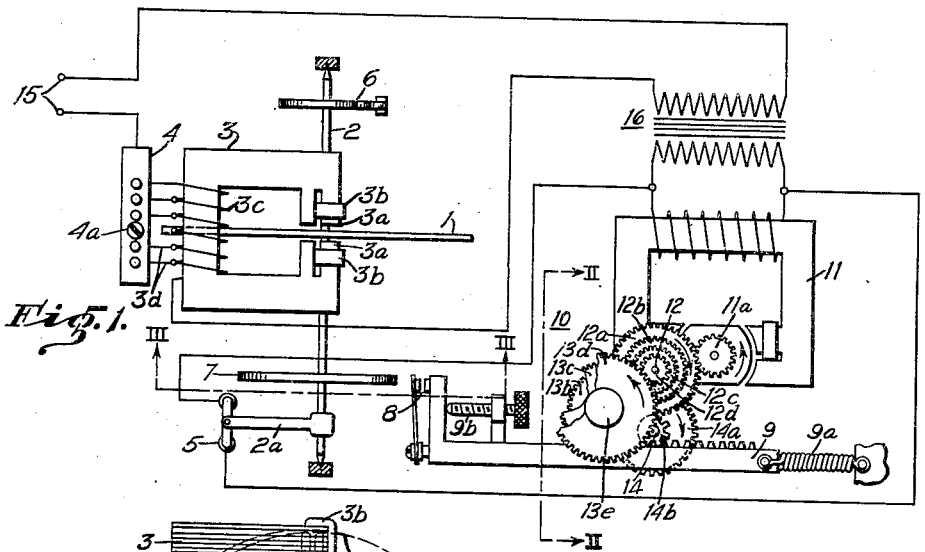
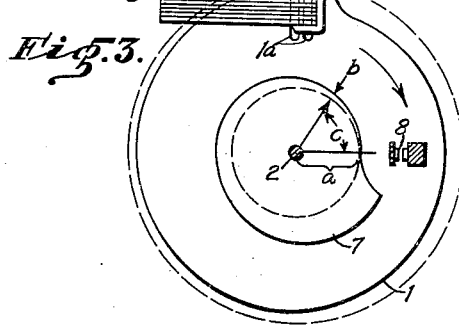
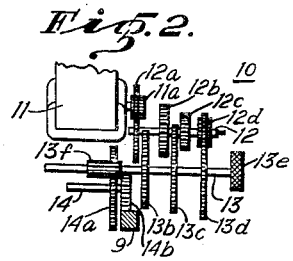
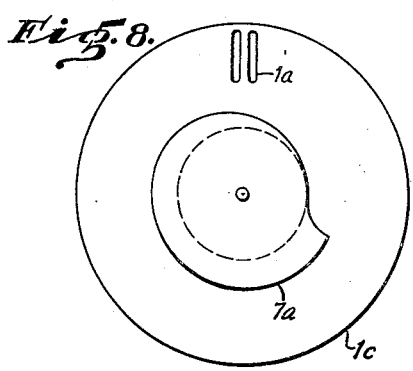
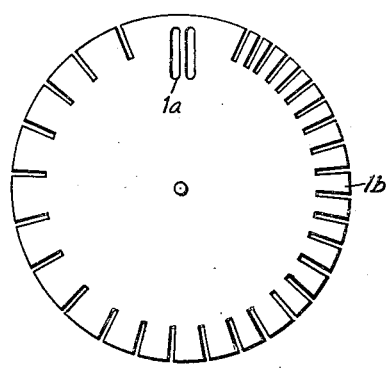
WITNESSES:
R. S. Williams
Geo. O. Harrison
INVENTOR
Shirley L. Goldsborough.
BY
ATTORNEY Sept. 11, 1934.  S. L. GOLDSBOROUGH  1,973,060
VARIABLE CHARACTERISTIC RELAY
Filed July 7, 1932   2 Sheets-Sheet 2
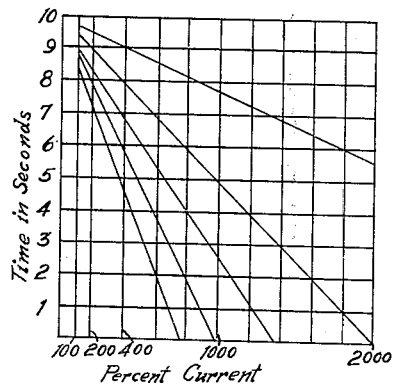
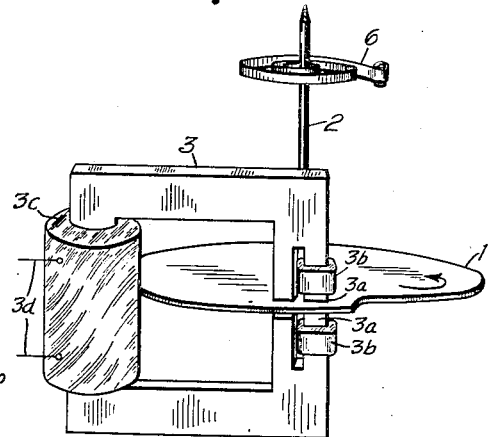
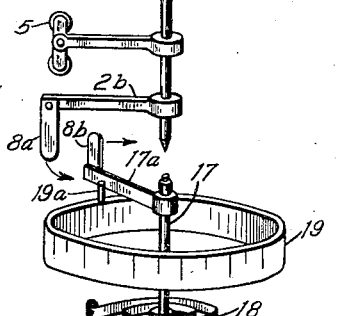
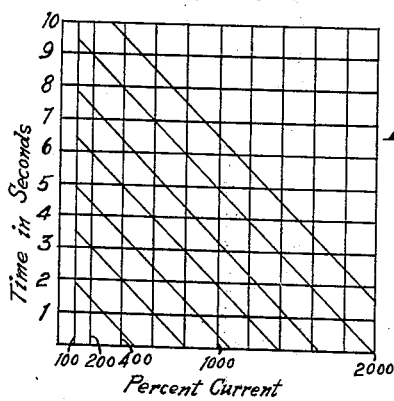
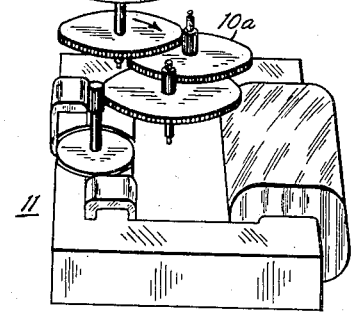
WITNESSES:
INVENTOR
Shirley L. Goldsborough.
BY
ATTORNEY Patented Sept. 11, 1934

1,973,060

UNITED STATES PATENT OFFICE 1,973,060

VARIABLE CHARACTERISTIC RELAY

Shirley L. Goldsborough, East Orange, N. J., assignor to Westinghouse Electric & Manufacturing Company, East Pittsburgh, Pa., a corporation of Pennsylvania Application July 7, 1932, Serial No. 621,143

10 Claims. (Cl. 175—294)

My invention relates to protective relays and particularly to protective relays of the inverse time element type.

In the co-pending application of Roy M. Smith, Serial No. 568,627, filed October 13, 1931 and assigned to the Westinghouse Electric and Manufacturing Company there is disclosed an overcurrent relay having characteristics such that for any setting of the relay adjusting mechanism, a unitary increase of operating current produces the same decrease of operating time, in any part of the relay operating range.

As explained in the above-mentioned application, relays having characteristics of this type are useful in a wide variety of protective applications, particularly in distribution systems in which selectivity in the time of operation of a plurality of relays is required.

The use of such relays in distribution systems permits closer relay settings and more rapid clearing of faults than is possible with relays of the previously known inverse time element types, because of the open uniformly sloping character of the relay time-current curves throughout the entire operating range. As pointed out in the above-mentioned application, the time-current curves of inverse time element relays of previously known types are of the general form of equilateral hyperbolas. As the time and current axes are asymptotes of these curves, the range of current values in which the curves are sufficiently open and separate to permit accurate differential settings is comparatively restricted.

It is an object of my invention to provide a novel protective relay in which the time-current characteristics may be made of any desired inverse form.

Another object of my invention is to provide a novel protective relay of the induction disc type which shall have time-current characteristics of broad range or straight line form, similar to the operating characteristics of the relay disclosed in the above-mentioned Smith application.

Other objects of my invention will become evident from the following detailed description taken in conjunction with the accompanying drawings in which Figure 1 is a diagrammatic view of a relay embodying my invention.

Fig. 2 is a sectional view of part of the relay shown in Fig. 1, taken along the line II—II of Fig. 1.

Fig. 3 is a sectional view of part of the relay shown in Fig. 1, taken along the line III—III of Fig. 1.

Figs. 4 to 6 inclusive are time-current curves illustrating adjustments of the relay shown in Fig. 1.

Fig. 7 is a plan view of an induction disc which may be used in the practice of my invention.

Fig. 8 is a view similar to Fig. 3 of a modified form of induction disc and cam which may be used in the practice of my invention.

Fig. 9 is a diagrammatic view in perspective of a modification of my invention.

Referring to Fig. 1 in detail, an induction disc 1 is rigidly secured upon a pivoted spindle 2 to rotate between the pole members 3a of a driving magnet 3. The driving magnet 3 is preferably of laminated construction as shown in Fig. 3, and is provided with shading coils 3b for producing a component of flux which shifts across the pole faces to produce rotation of the disc 1.

The driving magnet 3 is provided with an energizing coil 3c, having taps 3d connected to a connector block 4. The connector block 4 is provided with a plug 4a for changing the effective number of turns of the energizing coil 3c in a well known manner.

A contact arm 2a, or other suitable mechanism, is provided for maintaining a set of back contact members 5 closed while the spindle 2 is in a predetermined neutral position and for opening the back contact members 5 when the spindle 2 is rotated from neutral position.

A spiral spring 6 is provided for resiliently holding the spindle in the angular position in which the back contact members 5 are closed, and also for exerting a variable torque in opposition to the torque of the driving magnet 3. A cam 7 is rigidly secured to the spindle 2 to be rotated thereby.

The main contact members 8 of the relay are mounted on a rack member 9 which is movable into engagement with the cam 7, preferably on a line intersecting the axis of the spindle 2. A spring 9a is provided for normally withdrawing the rack 9 from engagement with the cam 7 into engagement with an adjustable stop member 9b.

The rack 9 is mechanically connected through an adjustable ratio gear train denoted generally by the reference numeral 10 to an alternating current motor 11 of any suitable constant speed type, which I have illustrated as a synchronous motor, to be driven thereby.

The gear train 10 consists of a pinion 11a rigidly secured to the shaft of motor 11, in mesh with a gear wheel 12a rigidly secured to a countershaft 12 (see Fig. 2). Three driving gears 12b, 12c and 12d are rigidly secured to the countershaft 12 in positions to be operatively engaged by one of a set of three driven gears 13b, 13c and 13d, respectively, rigidly secured to a longitudinally movable shaft 13. The longitudinally movable shaft 13 is provided with a knob 13e for moving the shaft longitudinally to thereby change the ratio of the gear train. A pinion 13f is rigidly secured to the shaft 13 in driving engagement with a gear wheel 14a rigidly secured to an idler shaft 14, upon which is also secured a driving pinion 14b in mesh with the rack member 9.

The operating coil 3c of the driving magnet 3 is connected to suitable terminals diagrammatically indicated at 15 in a circuit which includes the connector block 4 and the primary winding of a current transformer 16. The secondary winding of the current transformer 16 is connected to the winding of the synchronous motor 11. The winding of the synchronous motor 11 is connected to the back contact members 5 to be short-circuited thereby when the spindle 2 is in neutral position.

Referring now to Fig. 3, the part of the induction disc 1 between the pole faces 3a of the driving magnet 3 when the disc 1 is in neutral position, is reduced in area in any well known manner, such as by slots 1a, to prevent rotation of the induction disc in response to the alternating flux produced by the driving magnet 3 except when the alternating flux exceeds a predetermined value.

The periphery of the induction disc 1 is cut away in such a manner that the area of the disc under the pole faces is gradually reduced when the disc rotates in the counter-clockwise direction as may be best seen in Fig. 3. The purpose of this reduction of area is to make the angle of disc rotation proportional to the alternating current in the operating coil 3c for any particular setting of the connector block 4.

The torque exerted by a driving magnet of the type shown on a circular disc is approximately proportional to the square of the current, within the range of currents in which the driving magnet is unsaturated. The torque exerted by a spiral spring such as is indicated by the reference character 6 is approximately proportional to the angle of spindle rotation, provided this angle is measured from the angular position of the spindle at which the spring exerts no torque in either direction.

However, as it is necessary that the spring 6 exert sufficient torque in the neutral position of the spindle 2 to maintain the contact members 5 closed, the relationship of torque and angular position mentioned above does not hold exactly for angular rotation of the spindle 2 from neutral position. As the counter-clockwise torque of the spring 6 increases with increasing angle of clockwise rotation of the spindle 2 from neutral position, however, and as the clockwise torque exerted by the driving magnet 3 increases with increase of alternating current in its coil 3c, it is possible by modifying the periphery of the disc 1 to obtain clockwise angular deflection of the disc proportional to the alternating current in the coil 3c.

With the disc cut away in the manner described above to obtain a clockwise angular deflection of the spindle 2 from neutral position proportional to the alternating current in coil 3c, the cam 7 may be shaped to give any desired type of inverse-time element characteristics.

To obtain straight line current-time curves, such as those obtained with the relay disclosed in the Smith application mentioned above, the cam 7 is so proportioned that its increase of radius b (see Fig. 3) over its minimum radius a, is proportional to the angle c through which the cam 7 is rotated from neutral position.

The operation of the above described apparatus may be set forth as follows: If alternating current is supplied through the terminals 15 from an external source such as a current transformer (not shown) energized from a circuit to be protected, an alternating flux proportional to the current is produced by the driving magnet 3a.

An alternating current proportional to current in the coil 3c is induced in the secondary winding of the current transformer 16 and flows through the back contact members 5, leaving the motor 11 substantially de-energized.

Part of the alternating flux produced by the driving magnet 3 is retarded by the shading coils 3b to produce a flux component which shifts across the pole faces 3a from left to right in the figure.

The shifting component of flux produced by the driving magnet produces a torque on the induction disc 1 in a well known manner.

As long as the alternating flux produced by the driving magnet 3 remains below a predetermined value, the slots 1a and the spring 6 prevent rotation of the disc 1.

When the alternating current in the coil 3c exceeds the minimum operating value for the setting of plug 4a, the disc 1 rotates rapidly, being retarded somewhat by the damping action of the non-shifting component of flux of the driving magnet 3, to an angular position displaced from its neutral position by an angle proportional to the alternating current in the coil 3c. During this operation, the flux of the driving magnet operates to prevent excessive oscillation of the disc 1.

As soon as the disc 1 commences to rotate, the contact arm 2a opens the back contact members 5, thereby diverting the secondary current of the transformer 16 to the winding of the synchronous motor 11.

The synchronous motor 11 now operates at a constant speed determined by the frequency of the alternating current supply, to move the main contact members 8 into engagement with the cam 7 and thereby cause the closure of contact members 8 and a tripping operation of protective apparatus (not shown).

It will be noted that the distance through which the rack 9 must be moved to cause closure of the contacts 8 (Fig. 3) is reduced by the distance b, which is proportional to the angle of rotation c of the cam 7 and to the magnitude of the current in the coil 3c. As the rack 9 moves at a constant speed, the time of operation of the relay consists of a constant term minus a term directly proportional to the current. The time-current characteristics produced in this manner are straight lines such as shown in Figs. 4, 5 and 6.

Fig. 4 shows the effect upon the relay time-current characteristics of changing the effective number of turns of the coil 3c by means of the connector block 4 and plug 4a. Each of the sloping lines in Fig. 4 represents the relay operating characteristics over a range of loads for a particular position of the plug 4a.

Fig. 5 shows the effect of changing the gear ratio of the gear train 10 by means of the knob 13e.

Fig. 6 shows the effect upon the relay characteristics of changing the setting of the adjustable stop member 9b.

Referring now to Fig. 7, a modified form of induction disc 1b is shown therein, which may be substituted for the disc 1 of Figs. 1 and 3. The periphery of the disc 1b is slotted at unequal angular intervals in such a manner that the angular deflection of the disc from neutral position, when used in the relay shown in Fig. 1, will be directly proportional to the current in the coil 3c. It will be understood that the induction disc may be perforated or modified in other ways to obtain the desired result.

Fig. 8 shows a modified cam 7a and a circular disc 1c, which may be substituted for the cam 7 and disc 1 of Fig. 1. The angular deflection of the circular disc 1c is not directly proportional to the current in the coil 3c, but is approximately proportional to the square of the current. To obtain straight line time-current characteristics, the contour of the cam 7a which may be determined either empirically or by calculation, follows a different curve from that of the cam 7 of Fig. 1.

Referring now to Fig. 9, which shows the principal elements of a modified construction of the relay, the induction disc 1, spindle 2, driving magnet 3, back contacts 5 and spring 6 are constructed and arranged in the same manner as the corresponding elements of Fig. 1. The electrical connections of the Fig. 9 modification are the same as those shown in Fig. 1 and, for simplicity, have been omitted.

The main contact members of the modification shown in Fig. 9 comprise a contact member 8a mounted upon an arm 2b secured to the spindle 2, and a contact member 8b mounted upon an arm 17a rigidly secured to a shaft 17. The shaft 17 is pivotally mounted in a position such that its axis is in line with the axis of spindle 2.

The shaft 17 is mechanically connected by means of a gear train 10a to the synchronous motor 11 to be driven thereby. A spiral spring 18 is provided for biasing the shaft 17 to a position such that the arm 17a engages a stop member 19a secured to an index cylinder 19. The index cylinder 19 is adjustably mounted by means, not shown, so that it may be rotated manually to any of a number of angular positions and frictionally held against the bias of the spring 18.

The operation of the apparatus shown in Fig. 9 may be set forth as follows: Upon rotation of the disc 1 in response to over-current as described in connection with Fig. 1, the back contact members 5 are opened and the main contact member 8a rotates in the direction indicated by the arrow through an angle proportional to the relay operating current.

In response to the opening of back contact members 5, the synchronous motor 11 operates to rotate the main contact member 8b at a uniform speed in the direction indicated by the arrow. The contact member 8b engages the contact member 8a at the expiration of a time interval determined by the angular position of the contact member 8a. As the time required for engagement of the contact members 8a and 8b consists of a constant term minus a term directly proportional to the operating current, the time-current characteristics of the relay are of the straight line type heretofore considered. By adjusting the angular position of the index cylinder 19, a series of curves of the type shown in Fig. 6 may be obtained. Curves of the type shown in Figs. 4 and 5 may be obtained by means of the adjusting devices disclosed in connection with Fig. 1.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an overcurrent relay, a first movable element operable from a first normal position over a predetermined path, a second movable element operable from a second normal position over said path, overcurrent means for displacing said first element from said first normal position toward said second element an amount substantially proportional to a current condition only, and a timing device for driving said second element from said second normal position toward said first element at substantially constant speed.

2. In an overcurrent relay, a contact-controlling element movable from a predetermined normal position, means for exerting a variable biasing torque upon said element dependent upon the displacement of said element from said position and tending to move said element to said position, overcurrent means for displacing said element from said position, said overcurrent means being effective to produce a displacement substantially proportional to a current condition only, a second contact-controlling element movable from a predetermined normal position, a timing device for controlling the movement of said second element, and contact members operable in response to a predetermined positional relationship of said elements.

3. In an overcurrent relay, a contact-controlling element movable from a predetermined normal position, means for exerting a variable biasing torque upon said element dependent upon the displacement of said element from said position and tending to move said element to said position, induction means for displacing said element from said position comprising a driving magnet operable in response to a current condition only, said magnet having pole members, and an induction disc armature in cooperative relationship with said magnet and arranged to present an area of diminishing inductive effect between said pole members as the displacement of said element is increased, a second contact-controlling element movable from a predetermined normal position, a timing device for controlling the movement of said second element and contact members operable in response to a predetermined positional relationship of said elements.

4. In an overcurrent relay, a first contact-controlling element movable from a predetermined normal position, a spring for biasing said element to said position, an induction disc operator responsive to an overcurrent condition for displacing said element from said position an amount substantially proportional to said condition, a second contact-controlling element movable from a second normal position, an alternating current motive device for driving said second element at a substantially constant speed, means responsive to a predetermined movement of said operator for initiating operation of said device and contact members operable in response to a predetermined positional relationship of said elements.

5. In an overcurrent relay, a first contact-controlling element movable from a predetermined normal position, a spring for biasing said element to said position, an induction disc operator responsive to an overcurrent condition for displacing said element from said position an amount substantially proportional to said condition, a second contact-controlling element movable from a second normal position, means for biasing said second element to said second position, a synchronous motor for driving said second element from said second position, means responsive to movement of said first element from said first position for initiating operation of said synchronous motor, and contact members operable in response to a predetermined positional relationship of said elements.

6. In a protective relay, a first contact-controlling element movable from a predetermined normal position, a spring for biasing said element to said position, an induction disc operator for displacing said element from said position an amount dependent on the torque of said operator, a second movable contact-controlling element, an adjustable stop member, a spring for biasing said second element against said stop member, an alternating current motive device for displacing said second element from said stop member at a substantially constant speed, means responsive to movement of said first element from said first position for initiating operation of said motive device and contact members operable in response to a predetermined positional relationship of said elements, whereby the operating time of said relay may be varied by a uniform time interval throughout its entire range by adjustment of said stop member.

7. In a protective relay, a contact-controlling element movable from a limit position, means for moving said element under time control from said limit position to a contact operating position, contact members operable by said element in said contact operating position, and electromagnetic means having a winding, for reducing the time required for movement of said element from said limit position to said contact operating position an amount directly proportional to the current in said winding, whereby the time required for movement of said element from said limit position to said contact operating position equals a constant time interval minus a time interval proportional to the current in said winding.

8. In a protective relay, an induction disc operator having a winding, contact members, a contact-controlling element movable from a predetermined normal position through a predetermined range of travel to operate said contact members, driving means for moving said element from said position at a substantially constant speed, means controlled by said operator for reducing the travel of said element necessary to operate said contact members by an amount proportional to the current in said winding, and means for initiating operation of said driving means, whereby the time elapsing between operation of said last mentioned means and operation of said contact members equals a constant term minus a term proportional to the current in said winding.

9. In an overcurrent relay, a cam member mounted for rotary movement from a predetermined normal angular position, a spring for biasing said cam member to said position, a current responsive induction disc operator for rotating said cam member from said position against the bias of said spring an amount dependent upon a current condition, a rack member movable from a second normal position, an alternating current motive device for driving said rack member at a substantially constant speed, means responsive to a predetermined movement of said operator for initiating operation of said device and contact members operable in response to a predetermined positional relationship of said cam member and said rack member whereby the time-current curve of said relay is dependent upon the contour of said cam.

10. In an overcurrent relay, a first shaft, a second shaft, a pair of contact members, each of said contact members being mounted for independent movement along a common arc in response to rotation of a corresponding one of said shafts, means for biasing each of said contact members to an angular position in which said contact members are disengaged, a current responsive induction disc operator for rotating one of said shafts in a predetermined direction through an angle determined by a current condition, a synchronous motor for driving the other of said shafts in a direction such that said contact members are driven in opposite directions, and means responsive to a predetermined movement of said operator for initiating operation of said synchronous motor, whereby the time elapsing between operation of said last mentioned means and engagement of said contact members consists of a constant term minus a term dependent upon said current condition.

SHIRLEY L. GOLDSBOROUGH.